(12) United States Patent
Resh et al.

(10) Patent No.: US 6,473,272 B1
(45) Date of Patent: Oct. 29, 2002

(54) DYNAMMICALLY SYMMETRIC ACTUATOR

(75) Inventors: Roger A. Resh, Prior Lake; Theodore R. Browning, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 55 days.

(21) Appl. No.: 09/624,568

(22) Filed: Jul. 24, 2000

Related U.S. Application Data (60) Provisional application No. 60/192,063, filed on Mar. 24, 2000.

(51) Int. Cl.[7] ................................................. G11B 5/55
(52) U.S. Cl. ...................................................... 360/266
(58) Field of Search ............................... 360/265.9, 266

(56) References Cited

U.S. PATENT DOCUMENTS

| 4,630,158 A | 12/1986 | Spash | 360/103 |
|---|---|---|---|
| 5,218,496 A | 6/1993 | Kaczeus | 360/106 |
| 5,677,815 A | 10/1997 | Chan | 360/106 |
| 6,091,574 A * | 7/2000 | Misso | 360/104 |

FOREIGN PATENT DOCUMENTS

| EP | 0 364 263 A2 | 4/1990 |

\* cited by examiner

*Primary Examiner*—Robert S. Tupper
(74) *Attorney, Agent, or Firm*—Westman, Champlin & Kelly, P.A.

(57) ABSTRACT

A dynamically symmetric actuator is disclosed for reducing off-track motion. The dynamically symmetric actuator of the present invention limits torsional or twisting motion of the actuator arm which reduces off-track motion. In one embodiment, the actuator arm includes a thickness step designed to balance stiffness of inner and outer portions of the actuator arm. The thickness step forms multi-thickness tiers, the dimensions of which can be modeled to optimize a first bending mode frequency of the actuator arm to further reduce off-track motion or errors.

20 Claims, 9 Drawing Sheets

DYNAMMICALLY SYMMETRIC ACTUATOR

CROSS-REFERENCE TO RELATED APPLICATION

This application claims priority to U.S. Provisional Application No. 60/192,063 filed Mar. 24, 2000 and entitled "DYNAMICALLY SYMMETRIC PIVOT HOUSING".

FIELD OF THE INVENTION

The present invention relates to a data storage device. In particular, the present invention relates to a dynamically symmetric pivot housing or actuator.

BACKGROUND OF THE INVENTION

Disc drives are well-known in the industry. Disc drives are used to store digital information on rigid discs coated with a magnetizable material in a plurality of circular, concentric data tracks. Discs are mounted on a spindle motor which rotates the discs for operation. Information is read from or written to the disc surface via transducers carried on a slider. The slider is supported relative to a disc surface via a suspension connected to an actuator or E-block. The suspension is connected to an actuator arm of the actuator and includes a load beam for supplying a preload force to the slider. A gimbal spring flexibly couples the slider relative to the load beam. The lower surface of the slider defines an bearing surface. Rotation of discs via the spindle motor interacts with the bearing surface of the slider to create a hydrodynamic bearing.

The slider is positioned relative to various concentric data tracks via operation of the actuator. Operation of the hydrodynamic bearing and actuator introduce vibration to suspension components S supporting the head. Excitation or vibration of heads can cause lateral or off-track movement of the head in certain resonance modes which reduces operating efficiency of the disc drive. Disc drive operating speeds are increasing as well as track density. Increased operating speeds increase excitation or resonance of the suspension components supporting the heads. Increased drive density exacerbates lateral or off-track movement of the supported heads induced by excitation or resonance of the suspension components. The present invention provides a solution to this and other problems, and it offers advantages over the prior art.

SUMMARY OF THE INVENTION

The present invention relates to a dynamically symmetric actuator to reduce off-track movement of the heads for read/write operations. In one embodiment of a dynamically symmetric actuator, the actuator arm includes a thickness step designed to balance stiffness of inner and outer portions of the actuator arm. The dynamically symmetric actuator of the present invention limits torsional or twisting motion of the actuator arm to reduce off-track motion to reduce read/write errors.

DETAILED DESCRIPTION OF ILLUSTRATIVE EMBODIMENTS

Figure 1:
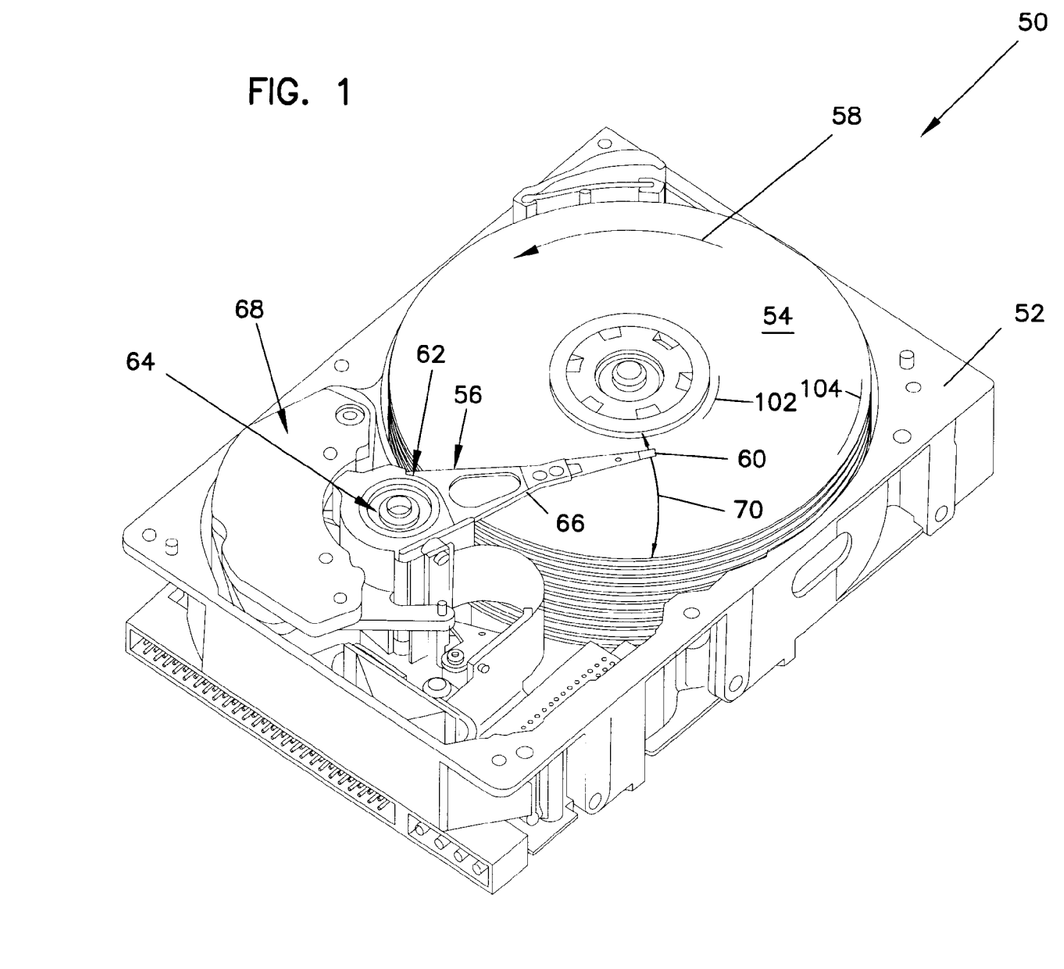
FIG. 1 is a perspective illustration of a disc drive including an actuator supporting heads for read/write operations.

The present invention has application for a data storage system as illustrated in FIG. 1. As illustrated, disc drive 50 includes a chassis 52, discs 54 and an actuator or E-block 56. A plurality of discs 54 are supported for co-rotation by a spindle drive (not shown in FIG. 1) as illustrated by arrow 58 to form a disc stack. Actuator 56 movably supports heads 60 for reading and/or writing data to and from discs 54 for operation of the disc drive.

The actuator 56 includes an actuator block 62 rotationally coupled to chassis 52 by a bearing cartridge 64 and having a plurality of stacked actuator arms 66 (only one shown in FIG. 1) extending therefrom to support heads 60 relative to the surface of discs 54. A voice coil motor 68 rotates actuator block 62 as illustrated by arrow 70 to move heads 60 along an arcuate path for placement of heads 60 relative to selected data tracks of discs 54. Operation of the voice coil motor 68 is controlled by control circuitry of the disc drive (not shown).

Figure 2:
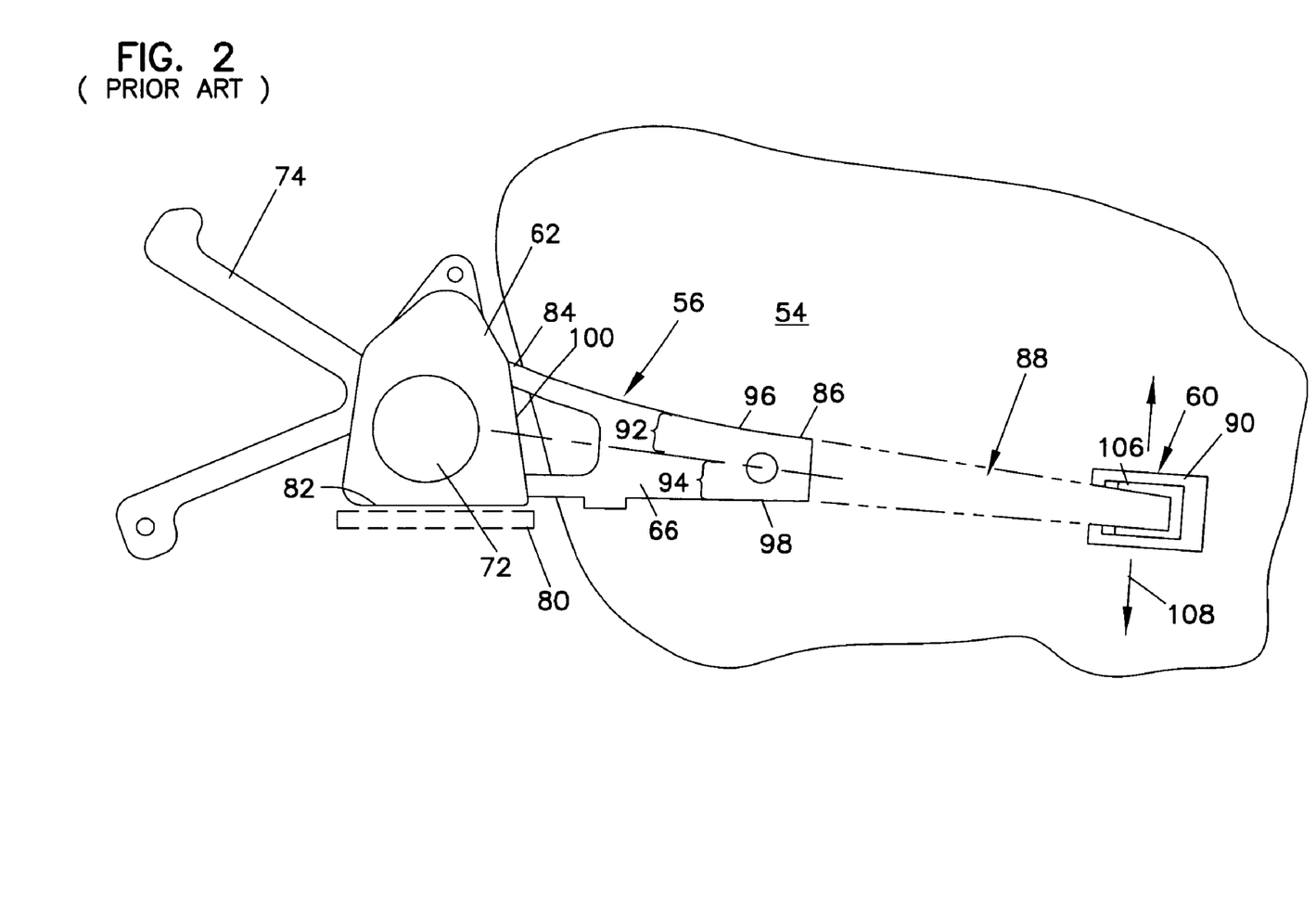
FIG. 2 is a plan view of a prior art actuator.

FIG. 2 is a top plan view illustrating an embodiment of an actuator 56 for supporting heads 60 for read or write operations. As shown, actuator block 62 includes a bearing channel 72 through which bearing cartridge 64 extends to rotationally couple actuator block 62 to the chassis 52 for operation. Yoke 74 extend from block 62 to support a wound coil (not shown) which forms a portion of the voice coil motor for operating the head actuator 56 along the arcuate path 70, as shown in FIG. 1, for read/write operations. Actuator block 62 supports a drive circuit board illustrated diagrammatically at 80 which is mounted on face 82 of block 62 to connect heads to drive circuitry (not shown) for operation. As previously explained, a plurality of stacked actuator arms 66 (only one shown in FIG. 2) are supported by actuator block 62 which include a fixed end 84 coupled to actuator block 62 and an extended cantilevered end 86. A suspension (illustrated in phantom) 88 and head gimbal assembly 90 are supported by and extend from cantilevered end 86 of actuator arm 66 to support heads 60.

Actuator arms 66 includes an inner arm portion 92 and an outer arm portion 94 each extending along a length of the actuator arm and cooperatively extending between opposed sides 96, 98 of the actuator arm 66. The inner arm portion 92 is oriented toward the air flow created by disc rotation with the outer portion 94 oriented behind the inner arm portion 92 in the direction of air flow. As illustrated in FIG. 2, actuator arm 66 is asymmetrically shaped relative to the inner and outer arm portions 92, 94. The asymmetric shape is a function of the shape or contour of the actuator block 62. The shape of the actuator block includes a planar face 82 for supporting circuit board 80 and an arm face 100 supporting actuator arms 66 which is angled from face 82 to provide operating clearance for movement of the actuator block 62 between inner and outer disc tracks 102, 104, as illustrated in FIG. 1.

During operation, movement of the actuator block 62 and rotation of discs 54 can excite or vibrate the head gimbal assembly 90, suspension 88 and actuator arm 66 supporting the heads 60. In particular, rotation of discs creates an air flow to bearing surfaces of sliders 106 supporting transducer elements which form heads 60 for reading and/or writing data. Drive performance, track densities, and disc rotation speeds are increasing. Increased rotation speeds increases excitation or movement of the head gimbal assembly 90, suspension 88 and actuator arm 66. External vibration or excitation of the actuator arm 66 or other suspension components can introduce varied motion to the head (or slider 106) including torsion, sway and bending mode resonance or vibration.

Vibration or excitation of varied resonance modes of the actuator 66 or other suspension components can introduce lateral or off track motion as illustrated by arrow 108 in FIG. 2 which can cause off-track errors interfering with read or write operations. As previously explained, disc drive capacity is increasing and thus, lateral or off-track motion accentuates errors during read/write operations since the spacing between data tracks is reduced. Thus, it is desirable to reduce excitation or off-track motion to the heads during read/write operations.

Figure 3:
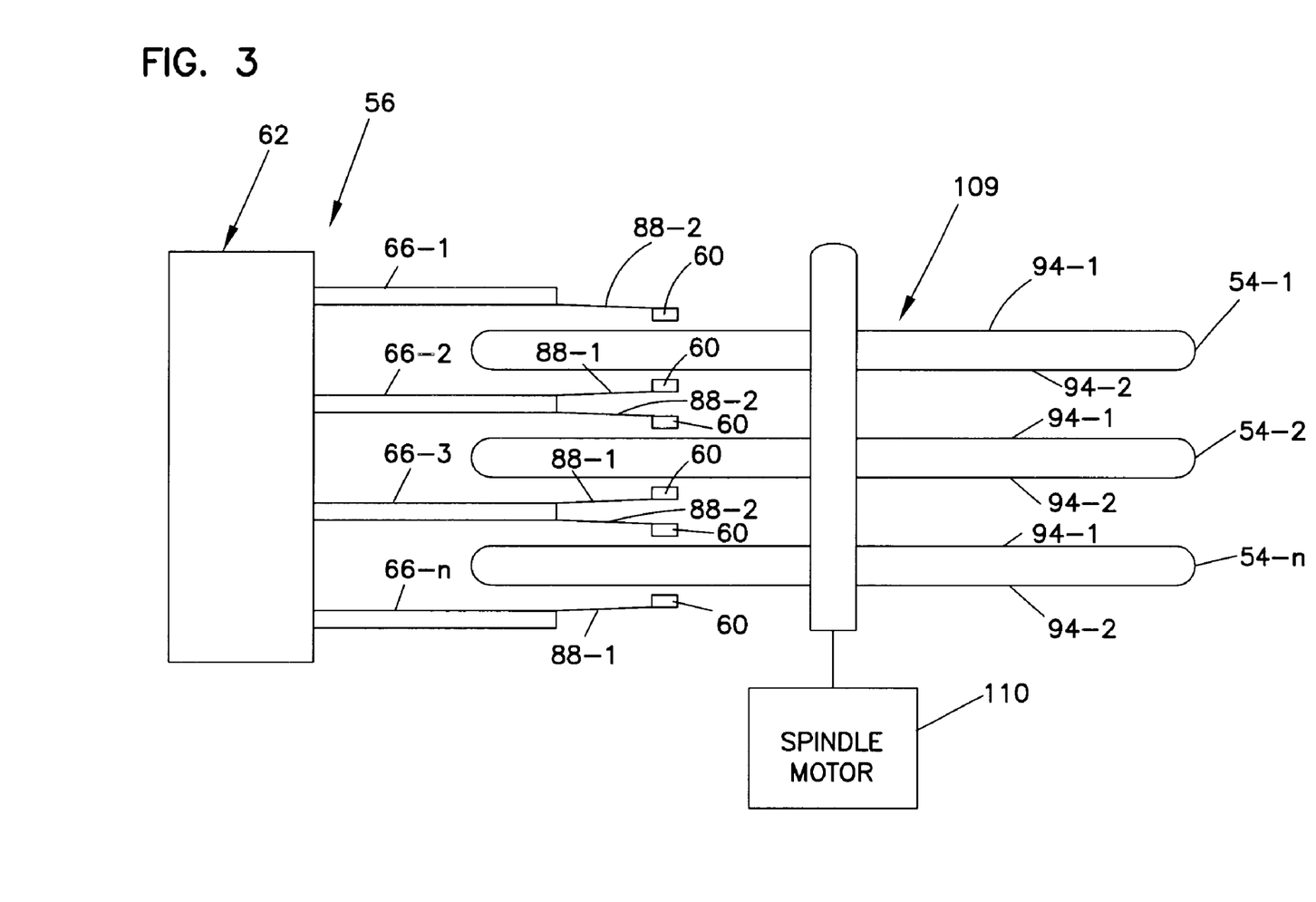
FIG. 3 is an illustration of an actuator including a plurality of actuator arms supporting heads to read data from or write data to a disc.

FIG. 3 is an illustration of actuator 56 supporting heads 60 to read data from or write data to surfaces of discs 54 in a disc stack 109. Disc stack 109 includes a plurality of discs 54-1, 54-2, 54-$n$ supported for co-rotation via spindle motor 110 as previously explained. A plurality of stacked actuator arms 66-1, 66-2, 66-3, 66-$n$ extend from block 62 to support suspension assemblies 88-1, 88-2 (and heads 60) in alignment with upper or lower disc surfaces 94-1, 94-2 of discs 54-1, 54-2, 54-$n$.

Upper suspension assemblies 88-1 support heads for reading data from and writing data to lower disc surfaces 94-2 and lower suspension assemblies 88-2 support heads 60 for reading data from and writing data to upper disc surfaces 94-1. Actuator arms 66-2, 66-3 support upper and lower suspension assemblies 88-1, 88-2 to read data from or write data to facing disc surfaces 94-1, 94-2 of adjacent discs, and actuator arms 68-1 and 68-$n$ support a single suspension assembly as shown. The heads 60 on upper suspension assemblies 88-1 face upwardly to read data from or write data to lower disc surfaces 94-2 and heads 60 on lower suspension assemblies 88-2 face downwardly to read data from or write data to an upper disc surface 94-1.

In the actuator of the type illustrated in FIG. 2 having an asymmetric actuator arm 66, upper and lower heads supported by the upper and lower suspension assemblies 88-1, 88-2 can have discrepancies in off-track movement or displacement between upper and lower heads. The present invention relates to a dynamically symmetric actuator which limits discrepancies in off-track movement or operating dynamics between the upper and lower heads supported by upper and lower suspensions 88-1, 88-2. The actuator of the present invention is designed to provide stiffness symmetry between the inner and outer arm portion 92, 94 to form a dynamically symmetric actuator arm which limits torsional or lateral movements excited or introduced due to the stiffness discrepancy between the inner and outer arm portions 92, 94.

Figure 4:
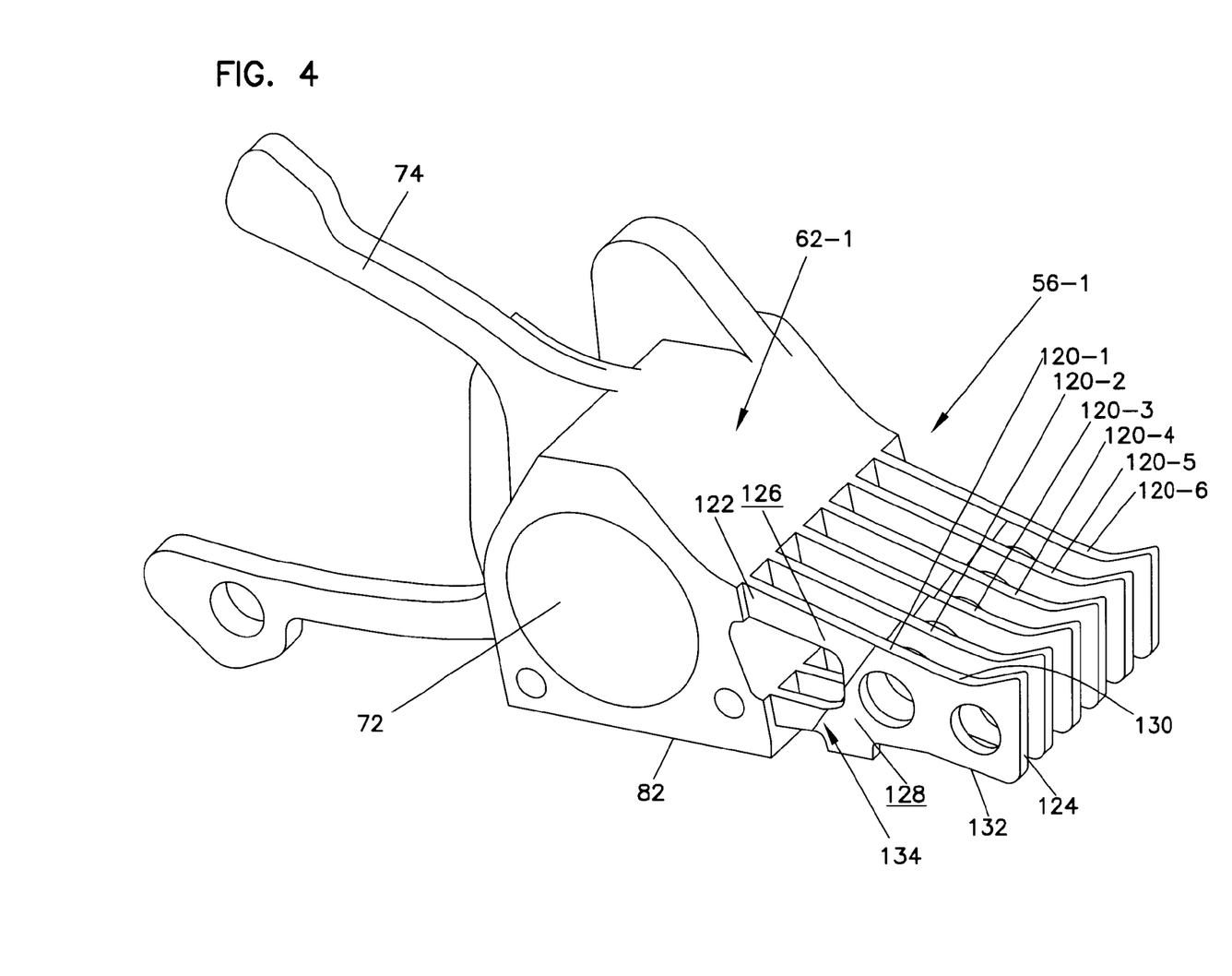
FIG. 4 is a perspective illustration of an embodiment of an actuator of the present invention.
Figure 5:
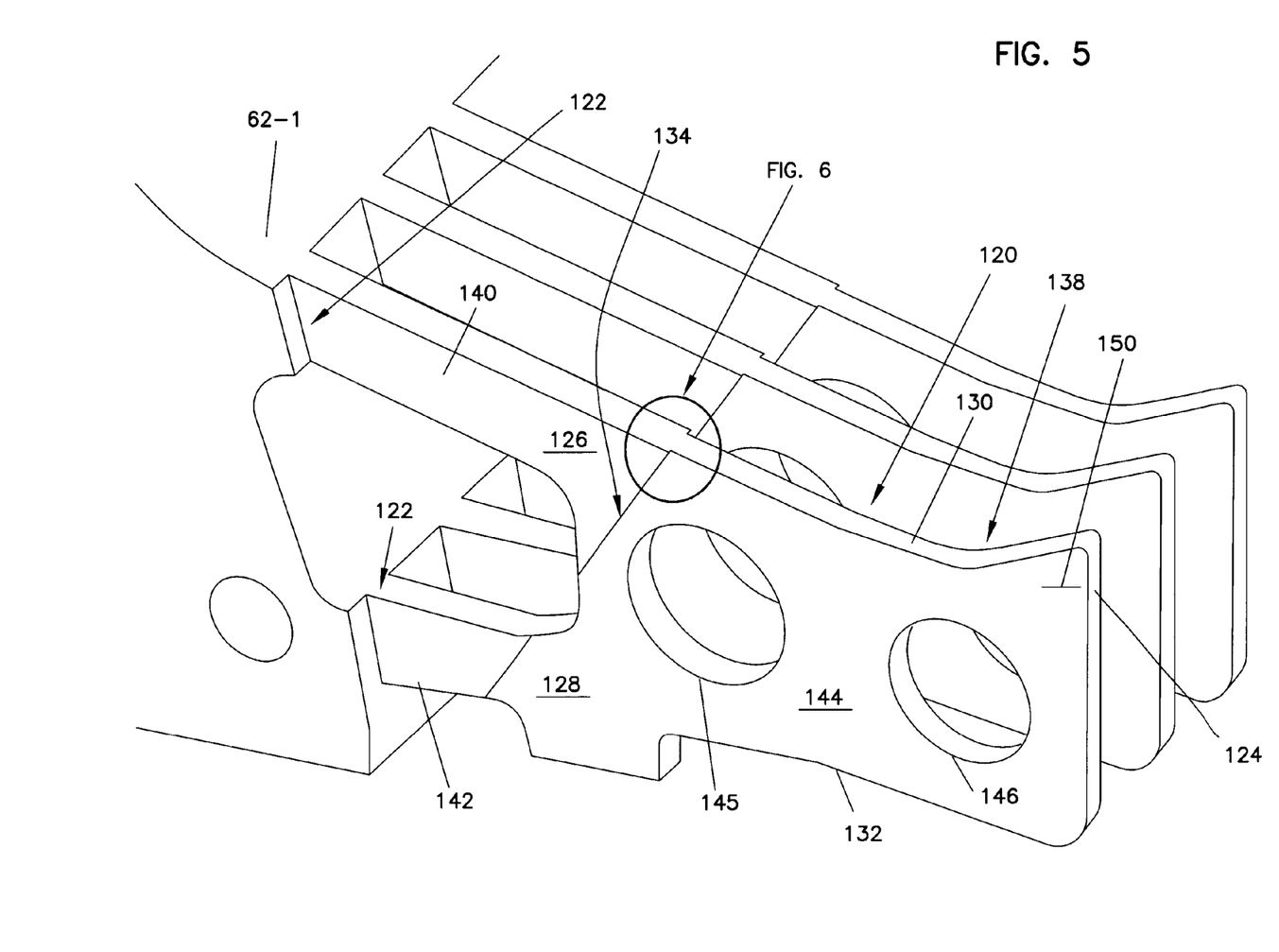
FIG. 5 is a detailed illustration of an actuator arm of the actuator illustrated in FIG. 4.

FIGS. 4–5 illustrates an embodiment of the dynamically symmetric actuator 56-1 of the present invention where like numbers are used to refer to like parts in the previous FIGS. As shown, actuator 56-1 includes a plurality of dynamically symmetric actuator arms 120 extending from block 62-1. Actuator arms 120 are connected to the actuator block 62-1 at a fixed end 122 and extend therefrom to a cantilevered end 124. The actuator arm 120 includes an inner portion 126 and an outer portion 128 each extending along the length of the actuator arm and cooperatively extending between opposed sides 130, 132 of the actuator arm 120. The inner arm portion 126 is oriented toward the air flow and the outer portion 128 is oriented behind the inner arm portion 126 in the direction of air flow.

In the embodiment shown in FIG. 5, the arm 120 includes a thickness step 134 extending between opposed sides 130, 132. The thickness step 134 is angled between sides 130, 132 to form stiffeners on inner and outer portions 126, 128 to compensate for or balance stiffness between the asymmetric inner and outer portions 126, 128 of arm 120 (i.e. increase stiffness of inner portion 126 relative to outer portion 128). The balanced stiffness limits torsional or lateral motion of the actuator arm 120 due to stiffness discrepancies between inner and outer portions 126, 128.

In the embodiment illustrated in FIG. 5, actuator arm 120 includes opposed inner and outer legs 140, 142 and a body portion 144. Legs 140, 142 are coupled to block 62 to form fixed end 122 and body portion 144 is coupled to an extended end of legs 140, 142 to form a length of the actuator arm 120 extending to the cantilevered end 124. In the embodiment shown, body portion 144 includes a mass reduction hole 145, and a staking hole 146 for connecting a suspension 88 (not shown in FIG. 5) to the actuator arm 120. The embodiment shown also includes a vibration shield 150 for reducing flow induced vibration as described in co-pending application Ser. No. 09/425,468, filed Oct. 22, 1999, and entitled "HEAD ACTUATOR WITH HEAD SUPPORT EXCITATION SHIELD".

As illustrated, legs 140, 142 of actuator arm 120 are asymmetrically shaped relative to one another due to the contour of the actuator block 62-1 to form asymmetric inner and outer portion 126, 128 of arm 120. In particular, inner leg 140 is longer than outer leg 142 and is more flexible or has a lower spring stiffness compared to outer leg 142. The lower spring stiffness of inner leg 140 and higher spring stiffness of outer leg 142 can cause the actuator arm 120 to bend or flex about inner leg 140 thus introducing off-track or lateral motion to the actuator arm 120 and supported heads 60 (not shown in FIG. 5).

As previously discussed, arm 120 includes thickness step 134 which extends between sides 130, 132 to form cooperating stiffeners on legs 140, 142 configured or sized to balance the relative stiffness on asymmetric legs 140, 142 to limit off-track movement of the heads 60 or bending or twisting of the outer leg 142 about the inner leg 140. Thickness step 134, as described and shown, forms multi-thickness tiers including a base thickness $t_1$, and an increased thickness $t_2$. In the illustrated embodiments, legs 140, 142 have increased thickness $t_2$ portions which are designed to balance the stiffness between inner and outer legs 140, 142. The thickness step 134 is angled to provide a larger increased thickness $t_2$ portion on leg 140, which extends along a longer extent of leg 140, and a smaller increased thickness portion on outer leg 142 which extends along a shorter extent of leg 142 to form a dynamically symmetric actuator.

In a preferred embodiment, thickness step 134 is at approximately a 60° angle. The preferred angle and thickness parameters can be modeled experimentally using finite analysis techniques. The ratio of $\delta_{IP}/\delta_{OP}$ illustrates dynamic symmetry between the inner and outer portions 126, 128 of arm 120. The ratio of $\delta_{IP}/\delta_{OP}$, where $\delta_{IP}$ is the arm bending modal eigenvector for the inner portion 126 and $\delta_{OP}$ is the arm bending modal eigenvector for the outer portion 128 can be used to model dimension parameters for a multi-tier structure to balance stiffness between the inner and outer portions. The closer $\delta_{IP}/\delta_{OP}$ is to 1.0, the more symmetrically balanced the inner and outer portions 126, 126 of the arm 120.

Figure 6:
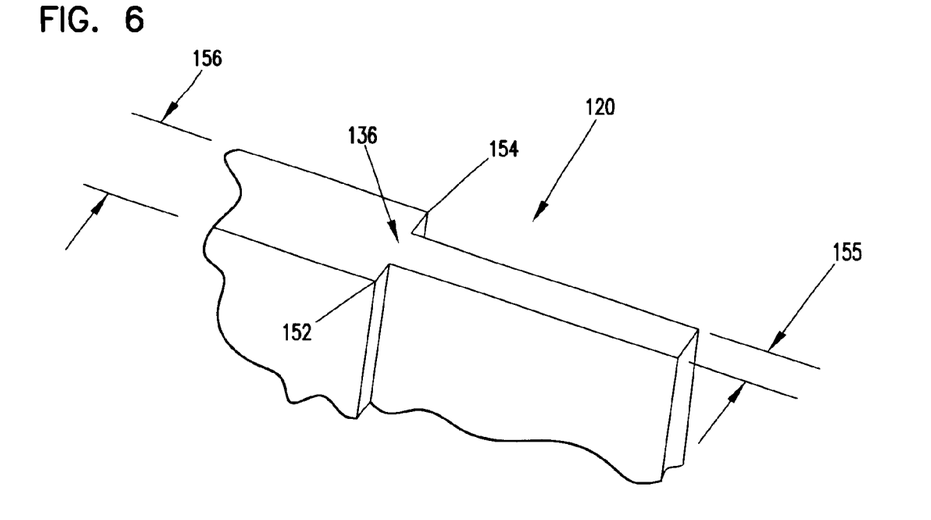
FIG. 6 is a detailed view of portion 6 of FIG. 5.

In the embodiment shown in FIG. 6, thickness step 134 is formed by surface steps 152, 154 on opposed surfaces of the actuator arm 120 to form base thickness 155 and increased thickness 156. Although FIG. 6 illustrates opposed surface steps 152, 154, application of a dynamically symmetric actuator arm is not limited to the specific embodiments shown. Thus, as described, the present invention includes stiffeners on the actuator arm modeled to compensate for stiffness differences between inner and outer arm portions 126, 128.

In the embodiment illustrated, stiffeners are machined on inner and outer legs 140, 142 and are sized to compensate for stiffness differences between asymmetric portions. A machined structure is easy to adapt to existing arm designs and manufacturing techniques. Alternatively, a multi-tier thickness arm 120 could be stamped from a plate material Although specific embodiments are shown, application of the present invention is not limited specific embodiments shown which include an increased thickness step on inner and outer leg portions 140, 142 and it should be understood that alternate stiffeners can be designed for the actuator arm to optimize the ratio of $\delta_{IP}/\delta_{OP} \approx 1.0$. For example, the stiffening plates could be adhered to inner or outer arm portions with a viscous dampening material 126, 128. The stiffening plates on the inner or outer arm portions 126, 128 are sized to compensate for stiffness variations to provide dynamic symmetry.

As previously explained, vibration introduced by dynamic operating components of the disc drive excite various resonances modes of the suspension components including the gimbal assembly, suspension and actuator arm. Resonance mode excitation of each of the suspension components varies based upon the mass and stiffness of the suspension components. The mass and stiffness characteristics of prior actuator arms provided a low first bending mode frequency for the actuator arm 120 which can be excited by vibration of operating components of the drive.

In the stepped or multi-tiered structure taught by the present invention, the multi-tier thickness can be experimentally modeled to compensate for stiffness difference while providing multiple parameters (e.g. multi-thickness parameters) which can also be modeled to optimize the first bending mode frequency of the actuator arm. For optimum performance, it is desirable to increase the first bending mode frequency of the actuator arm to limit excitation during operation of the disc drive. An increased or high enough (for example, frequency $\geq$ approximately 1500 kHz) first bending mode frequency can limit excitation and thus reduce off-track motion of the heads during operation of the disc drive.

One embodiment of a modeled two-tier structure of the type illustrated in FIG. 5 provides a first bending mode frequency of $\approx$1500 kHz for a form factor actuator. The modeled dimensions for interior arms 120-2, 120-3, 120-4, 120-5 supporting multiple suspensions 88-1, 88-2 included a thickness step 134 angle of 60°, a base thickness of 0.024 inches and a increased thickness =0.032 inches for an arm length of $\approx$0.54 inches. Exterior arms 120-1, 120-6 supporting a single suspension are designed to provide similar operating characteristics as interior arms 120-2, 120-3, 120-4, 120-5 and can include an increased thickness of 0.030 inches.

Figure 7:
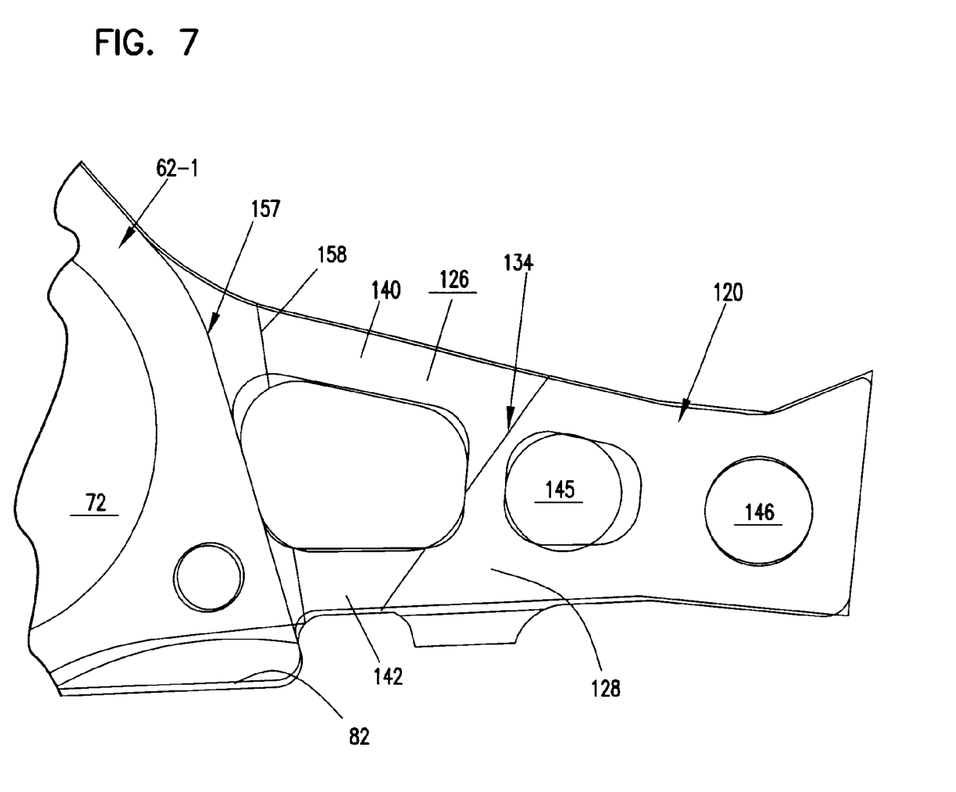
FIG. 7 illustrates an actuator block including a modified actuator arm face to improve dynamic symmetry of an actuator arm.

The profile of actuator block 62-1 can be modeled to optimize the contour of arm face 100-1 within form factor dimensions to increase the length of leg 142 (or outer portion 128) and reduce the length of leg 142 (or inner portion 126) to reduce asymmetry between legs 140, 142 (or inner or outer arm portions 126, 128). FIG. 7 illustrates prior interface angle 157 between arm 120 and actuator block 162-1. Line 158 in FIG. 7 illustrates a more optimum contour or interface angle between arm 120 and block 162-1. As illustrated by line 158, interface angle is sloped to balance the discrepancy in leg 140, 142 length to reduce dynamic operating differences between inner and outer portions 126, 128 of arm 120. Optimum interface contour or angle can be modeled experimentally to optimize symmetry and the first bending mode frequency of the actuator arm within the form factor dimensions.

Operating dynamics of the illustrative embodiments described were compared to prior asymmetric actuator designs as illustrated in Table 1 below.

TABLE 1

| ARM | PRIOR INTERNAL ARM | NEW INTERNAL ARM | NEW EXTERNAL ARM |
| --- | --- | --- | --- |
| FIRST BENDING MODE FREQUENCY (kHz) | 1.30 | 1.49 | 1.51 |
| SYMMETRY | 5.5 | 1.5 | 1.6 |

Symmetry is measured as off-track motion in $\mu$inches per mil of arm 120 vertical displacement. As illustrated in Table 1 above, the first bending mode frequency increased to $\approx$1500 Hz and symmetry as measured by off-track motion decreased.

Figure 8:
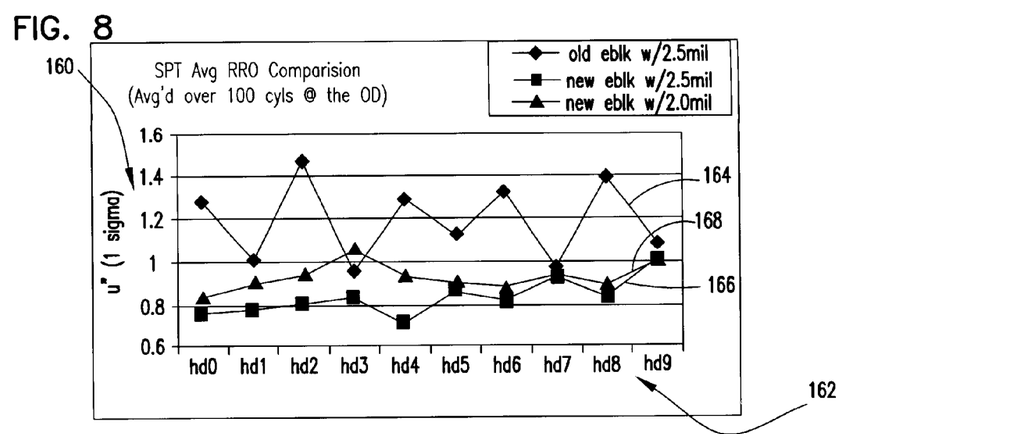
FIGS. 8–15 comparatively illustrate operating dynamics for prior actuators and embodiments of actuators of the present invention.
Figure 9:
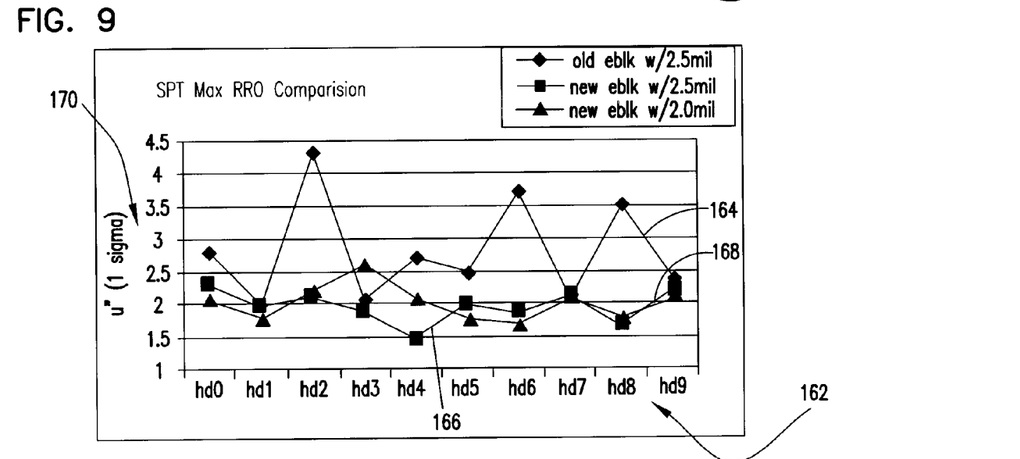
Figure 10:
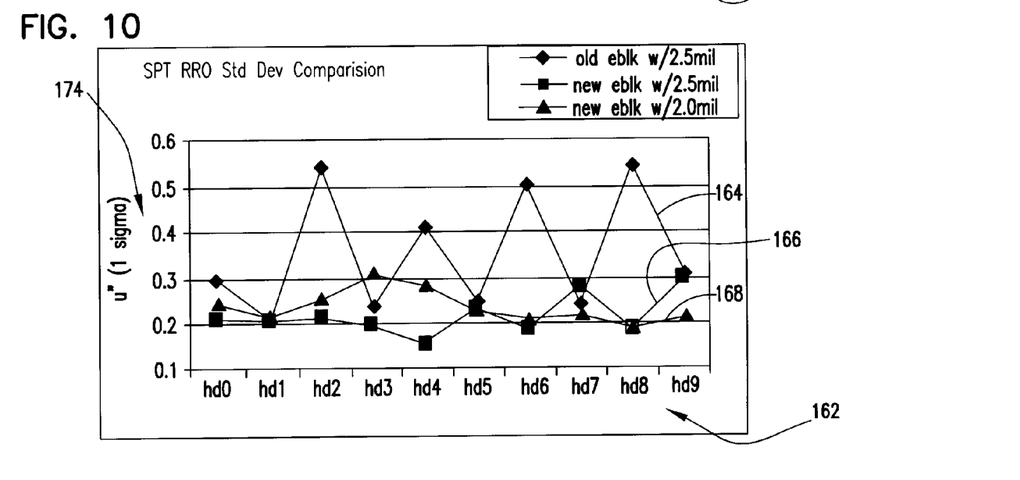
Figure 11:
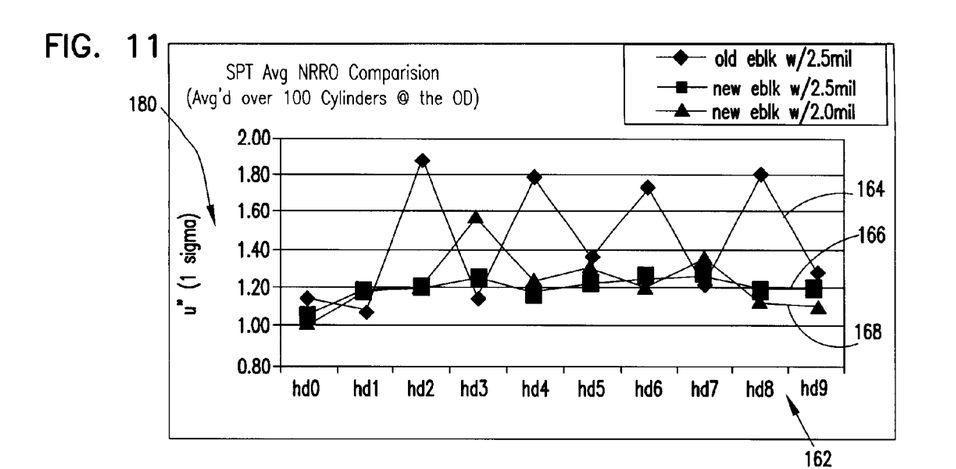
Figure 12:
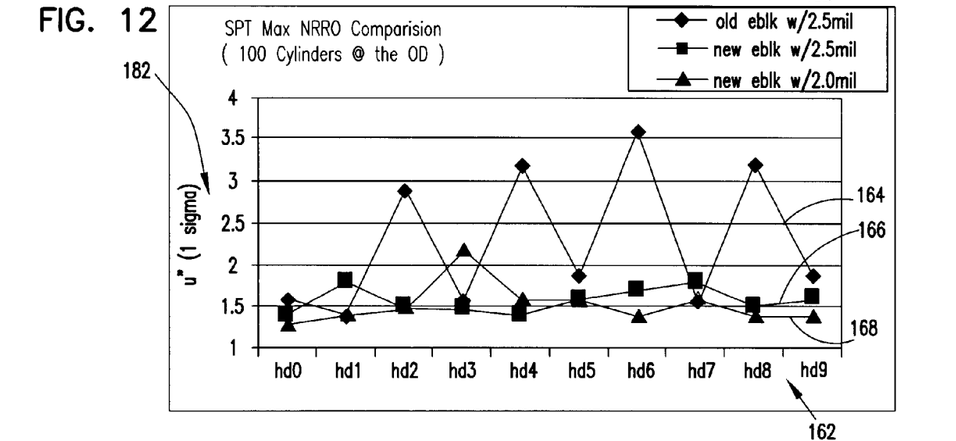
Figure 13:
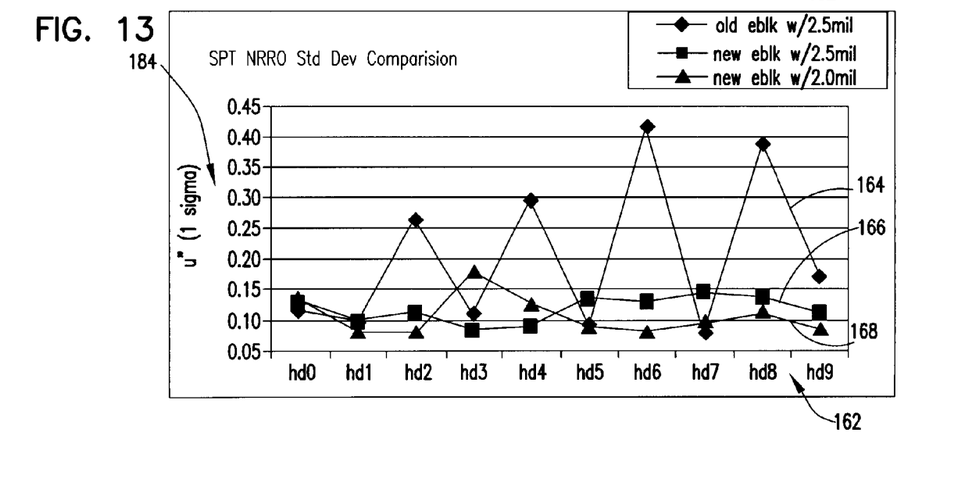

FIGS. 8–15 graphically illustrate performance analysis for a dynamically symmetric actuator design or E-block ("eblk") including suspension supporting heads. FIGS. 8–10 graphically illustrate repeatable run out (RRO) or off-track movement. FIGS. 11–13 graphically illustrate non-repeatable run out (NRRO) or off-track movement and FIGS. 14–15 graphically illustrate run-out (RO) where $RO^2=NRRO^2+RRO^2$. FIG. 8 illustrates average RRO 160 expressed as $\mu$"(1 sigma) averaged over 100 cycles for samples hd0–hd9 along axis 162 for actuators 164, 166, 168. Actuator 164 is a prior asymmetric actuator design having 2.5 mil suspension and actuators 166, 168 are dynamically symmetric actuators having a 2.5 mil and 2.0 mil suspension, respectively. As shown, RRO 160 for the dynamically symmetric actuators 166, 168 was significantly reduced over actuator 164.

FIG. 9 illustrates the maximum RRO 170 expressed as $\mu$" (1 sigma) for samples hd0–hd9 162 for actuators 164, 166 and 168 and as shown, maximum RRO 170 was greatly reduced for actuators 166, 168 relative to prior actuator 164. FIG. 9 illustrates a standard deviation for RRO 174 expressed as $\mu$" (1 sigma) for samples hd0–hd9 162 for actuators 164, 166, 168. As shown, the standard deviation RRO 174 for the dynamically symmetric actuators 166, 168 was reduced in comparison to actuator 164. FIG. 11 illustrates average NRRO 180 expressed as $\mu$" (1 sigma) for samples hd0–hd9 162.

Figure 14:
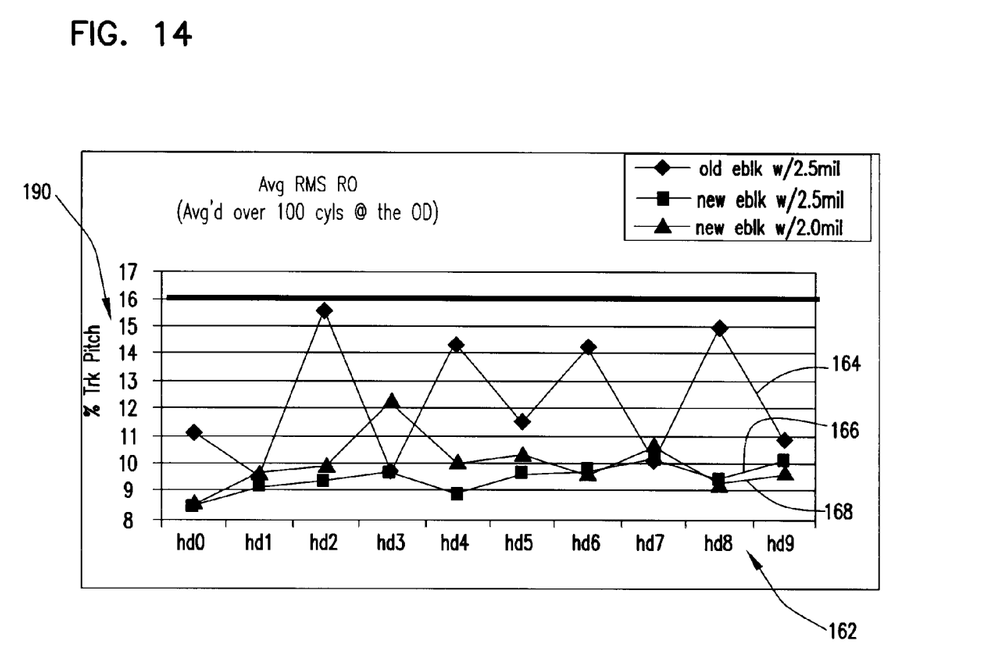
Figure 15:
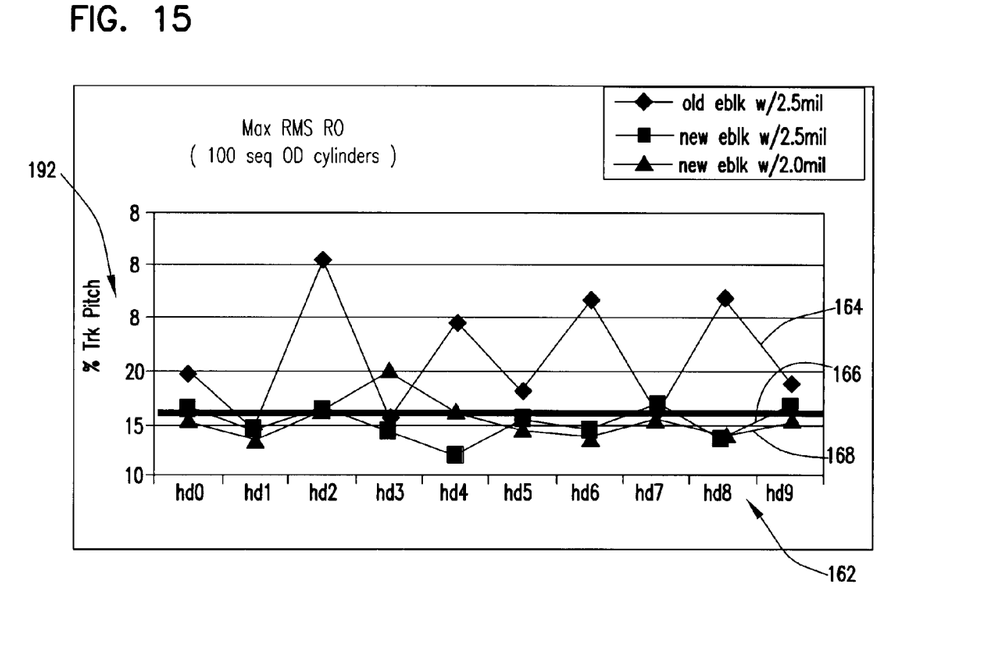

FIG. 12 illustrates maximum NRRO 182 expressed as $\mu$" (1 sigma) and FIG. 13 illustrates standard deviation NRRO 184 for samples hd0–hd9 162 of actuators 164, 166, 168. As shown, actuators 166, 168 have less average NRRO 180, maximum NRRO 182 and standard deviation NRRO 184 expressed as μ" (1 sigma) than prior actuator design 164. FIGS. 14–15 illustrate average root mean square RO (Ave RMS RO) 190 expressed as a percentage of track pitch, and maximum root mean square RO 192 (Max RMS RO) expressed as a percentage of track pitch, for samples hd0–hd9 162 for actuators 164, 166, 168, respectively. As shown, actuators 166, 168 had a lower Ave RMS RO 190 and Max RMS RO 192 than prior actuator design 160 for improved performance.

A dynamically symmetric actuator 56-1 for reducing off-track motion which includes stiffeners on the actuator arms to compensate for stiffness differences between inner and outer arm portions. In the embodiment illustrated in FIG. 5, the actuator arm 120 of the dynamically symmetric actuator includes a thickness step 134 designed to balance stiffness of inner and outer portions 126, 128 of the actuator arm 120. The thickness step 134 is angled to proportionally increase stiffness of the inner and outer arm portions (or legs 140, 142) to dynamically balance the actuator arm 120. The dynamically symmetric actuator of the present invention limits torsional or twisting motion of the actuator arm which reduce off-track motion. The thickness step forms multi-thickness tiers, the dimensions of which can be modeled to optimize a first bending mode frequency of the actuator arm to further reduce off-track motion or errors.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular high performance disc drive system, it will be appreciated by those skilled in the art that the teachings of the present invention can be applied to other systems, including optical systems, without departing from the scope and spirit of the present invention.

What is claimed is:

1. An actuator for a disc drive comprising:
   an actuator block having a bearing;
   at least one actuator arm having a longitudinal length cantilevered from the actuator block to form a fixed end and an extended cantilevered end and having an asymmetric shape about a dynamic axis along the longitudinal length of the actuator arm to form asymmetric shaped arm portions about the dynamic axis; and
   an asymmetric thickness step on the at least one actuator arm having an asymmetric profile about the dynamic axis to form multi-asymmetric thickness tiers configured to compensate for stiffness differences of the asymmetric shaped arm portions of the at least one actuator arm.

2. The actuator of claim 1 wherein the asymmetric thickness step includes surface steps on opposed surfaces of the at least one actuator arm.

3. The actuator of claim 1 wherein the asymmetric thickness step extends between opposed sides of the at least one actuator arm.

4. The actuator of claim 3 wherein the asymmetric thickness step is angled from one side of the opposed sides of the at least one actuator arm to another side of the opposed sides of the at least one actuator arm.

5. The actuator of claim 1 wherein the at least one actuator arm includes asymmetric shaped inner and outer legs about the dynamic axis and a body portion extending therefrom and the asymmetric thickness step is formed on the inner and outer legs to compensate for stiffness differences between the inner and outer legs.

6. The actuator of claim 5 wherein the asymmetric thickness step forms the multi-asymmetric thickness tiers on the actuator arm including a base thickness and an increased thickness and a greater portion of the inner leg has the increased thickness compared to the outer leg to compensate for the stiffness differences between the inner and outer legs.

7. The actuator of claim 1 wherein the multi-asymmetric thickness tiers have a thickness dimension sized to optimize dynamic symmetry and a first bending mode frequency of the at least one actuator arm.

8. The actuator of claim 6 wherein the actuator includes a plurality of actuator arms cantilevered from the actuator block and the increased thickness is approximately 0.032 inches for an interior arm of the actuator.

9. The actuator of claim 6 wherein the actuator includes a plurality of actuator arms cantilevered from the actuator block and the increased thickness for an exterior arm of the actuator is 0.030 inches.

10. The actuator of claim 6 wherein the base thickness is 0.024 inches.

11. The actuator of claim 1 including an angled interface between the at least one actuator arm and the actuator block sized to reduce asymmetry between the asymmetric shaped arm portions of the actuator arm about the dynamic axis within form factor dimensions.

12. An actuator for a disc drive comprising:
    an actuator block supporting an actuator arm having an asymmetric shape about a dynamic axis extending along a longitudinal length of the actuator arm; and
    dynamic symmetry means for providing dynamic symmetry for the asymmetric actuator arm.

13. An actuator for a disc drive comprising:
    an actuator block having at least one actuator arm extending therefrom having an asymmetric shape about a dynamic axis extending along a cantilevered length of the at least one actuator arm to form asymmetric shaped arm portions about the dynamic axis; and
    a stiffener formed on the at least one actuator arm to dynamically balance the asymmetric shaped arm portions of the at least one actuator arm about the dynamic axis.

14. The actuator of claim 13 wherein the at least one asymmetric shaped actuator arm includes a thickness along the cantilevered length thereof and the stiffener includes a thickness step along the cantilevered length.

15. The actuator of claim 14 wherein the thickness step is formed on the asymmetric shaped arm portions of the at least one actuator arm about the dynamic axis.

16. The actuator of claim 14 wherein the thickness step is machined on the at least one actuator arm.

17. The actuator of claim 15 wherein the thickness step forms multi-asymmetric thickness tiers including a base thickness and an increased thickness and a dimension of the increased thickness is sized to compensate for stiffness differences between the asymmetric arm portions of the at least one actuator arm.

18. The actuator of claim 17 wherein the at least one actuator arm includes asymmetric shaped inner and outer legs and a body portion extending therefrom and the increased thickness is formed on the inner and outer legs to compensate for stiffness differences of the asymmetric shaped inner and outer legs.

19. The actuator of claim 14 wherein the thickness step includes surface steps on opposed surfaces of the at least one actuator arm.

20. The actuator of claim 17 wherein the multi-asymmetric thickness tiers are sized to provide a first bending mode frequency for the at least one actuator arm of approximately 1500 Hz.

* * * * *

UNITED STATES PATENT AND TRADEMARK OFFICE
CERTIFICATE OF CORRECTION

PATENT NO.      : 6,473,272 B1
DATED           : October 29, 2002
INVENTOR(S)     : Resh et al.

It is certified that error appears in the above-identified patent and that said Letters Patent is hereby corrected as shown below:

<u>Title page, Item [54] and Column 1, line 1,</u>
Title should read -- DYNAMICALLY SYMMETRIC ACTUATOR --

Signed and Sealed this

Twenty-second Day of April, 2003

JAMES E. ROGAN
*Director of the United States Patent and Trademark Office*